US010291687B2

(12) United States Patent
Nakamura

(10) Patent No.: US 10,291,687 B2
(45) Date of Patent: May 14, 2019

(54) IN-VEHICLE GATEWAY APPARATUS, COMMUNICATION SYSTEM FOR VEHICLE AND PROGRAM PRODUCT FOR TRANSMITTING VEHICLE RELATED DATA SET

(71) Applicant: DENSO CORPORATION, Kariya, Aichi-pref. (JP)

(72) Inventor: Shuuji Nakamura, Chita-gun (JP)

(73) Assignee: DENSO CORPORATION, Kariya-city, Aichi-pref. (JP)

( * ) Notice: Subject to any disclaimer, the term of this patent is extended or adjusted under 35 U.S.C. 154(b) by 342 days.

(21) Appl. No.: 13/735,292

(22) Filed: Jan. 7, 2013

(65) Prior Publication Data
US 2013/0185389 A1 Jul. 18, 2013

(30) Foreign Application Priority Data
Jan. 16, 2012 (JP) .................................. 2012-006411

(51) Int. Cl.
*H04L 29/08* (2006.01)
*H04L 12/40* (2006.01)

(52) U.S. Cl.
CPC ........ *H04L 67/10* (2013.01); *H04L 12/40189* (2013.01); *H04L 2012/40273* (2013.01)

(58) Field of Classification Search
CPC ............................... H04L 67/00; H04L 67/10
(Continued)

(56) References Cited

U.S. PATENT DOCUMENTS 5,729,546 A * 3/1998 Gupta ................. H04L 12/5601
370/394
6,133,846 A 10/2000 Birkedahl et al.
(Continued)

FOREIGN PATENT DOCUMENTS

| CN | 102193549 | 9/2011 |
| JP | 2002-530245 | 9/2002 |

(Continued)

OTHER PUBLICATIONS

J. Stone, MILCOM 2000 Proceedings. 21st Century Military Communications. Architectures and Technologies for Information SuperiorityLos Angeles, Los Angeles, CA, 2000, pp. 30-34.*
(Continued)

*Primary Examiner* — Oscar A Louie
*Assistant Examiner* — Messeret F Gebre
(74) *Attorney, Agent, or Firm* — Harness, Dickey & Pierce, P.L.C.

(57) ABSTRACT

An in-vehicle gateway apparatus includes a first communication section and a second communication section. The first communication section receives a vehicle related data set including multiple data elements from a data transmit apparatus. The second communication section transmits a processed data set processed based on the vehicle related data set to an in-vehicle LAN group including a first in-vehicle LAN and a second in-vehicle LAN. The second in-vehicle LAN has a communication speed lower than a communication speed of the first in-vehicle LAN. The second communication section transmits a first processed data set processed based on the vehicle related data set to the first in-vehicle LAN, and transmits a second processed data set processed based on the vehicle related data set and having less data elements than the first processed data set to the second in-vehicle LAN.

18 Claims, 5 Drawing Sheets

(58) Field of Classification Search
USPC .................................................. 709/219, 217
See application file for complete search history.

(56) References Cited

U.S. PATENT DOCUMENTS

| | | | |
|---|---|---|---|
| 6,941,194 B1 | 9/2005 | Dauner et al. | |
| 7,813,359 B1* | 10/2010 | Yamawaki | H04L 12/66 370/402 |
| 2002/0161497 A1* | 10/2002 | Maeda et al. | 701/35 |
| 2003/0009271 A1 | 1/2003 | Akiyama | |
| 2004/0148537 A1 | 7/2004 | Fuehrer et al. | |
| 2004/0158362 A1 | 8/2004 | Fuehrer et al. | |
| 2004/0193932 A1 | 9/2004 | Fuehrer et al. | |
| 2005/0040709 A1 | 2/2005 | Enders et al. | |
| 2005/0141565 A1 | 6/2005 | Forest et al. | |
| 2005/0254518 A1* | 11/2005 | Fujimori | H04L 69/08 370/466 |
| 2006/0171410 A1 | 8/2006 | Jung et al. | |
| 2006/0218427 A1 | 9/2006 | Fuehrer et al. | |
| 2007/0106441 A1* | 5/2007 | Ono | B60W 10/06 701/36 |
| 2007/0192020 A1* | 8/2007 | Brulle-Drews | G01C 21/3647 701/532 |
| 2007/0286225 A1 | 12/2007 | Enders et al. | |
| 2008/0195882 A1 | 8/2008 | Fuehrer et al. | |
| 2008/0304499 A1* | 12/2008 | Jeon et al. | 370/401 |
| 2009/0072998 A1* | 3/2009 | Yanase | G08G 1/096741 340/905 |
| 2010/0098095 A1* | 4/2010 | Kato et al. | 370/401 |
| 2010/0281010 A1 | 11/2010 | Yamamoto | |
| 2010/0332072 A1* | 12/2010 | Ishiko | B60T 17/221 701/29.5 |
| 2011/0113107 A1* | 5/2011 | Hartwich | H04L 12/40032 709/206 |
| 2012/0140861 A1* | 6/2012 | Menon et al. | 375/356 |
| 2012/0163400 A1 | 6/2012 | Hartwich | |

FOREIGN PATENT DOCUMENTS

| | | |
|---|---|---|
| JP | 2003-046536 | 2/2003 |
| JP | 2007-28376 | 2/2007 |
| JP | 2009-055361 | 3/2009 |
| JP | 2009-212939 | 9/2009 |

OTHER PUBLICATIONS

Berry, F.M., "FM receivers with supersonic control", vol. 29, 1949, pp. 12-14.*
F. Bai, "GrooveNet: A Hybrid Simulator for Vehicle-to-Vehicle Networks," 2006 Third Annual International Conference on Mobile and Ubiquitous Systems: Networking & Services, San Jose, CA, 2006, pp. 1-8.*
Extended European Search Report dated Apr. 23, 2013 in corresponding EP Application No. 12195246.9.
Talbot, S.C. et al, "Comparison of Field Bus System CAN, TTCAN, FlexRay and LIN in Passenger Vehicles"; 2009 29$^{th}$ IEEE International Conference on Distributed Computing Systems Workshops.
Office Action dated Dec. 9, 2014 in corresponding Japanese application No. 2012-006411.
Office Action dated Mar. 5, 2015 in corresponding European application No. 12195246.9.
Office Action dated May 27, 2015 in the corresponding Chinese Application No. 201310013107.5 with English translation.

* cited by examiner

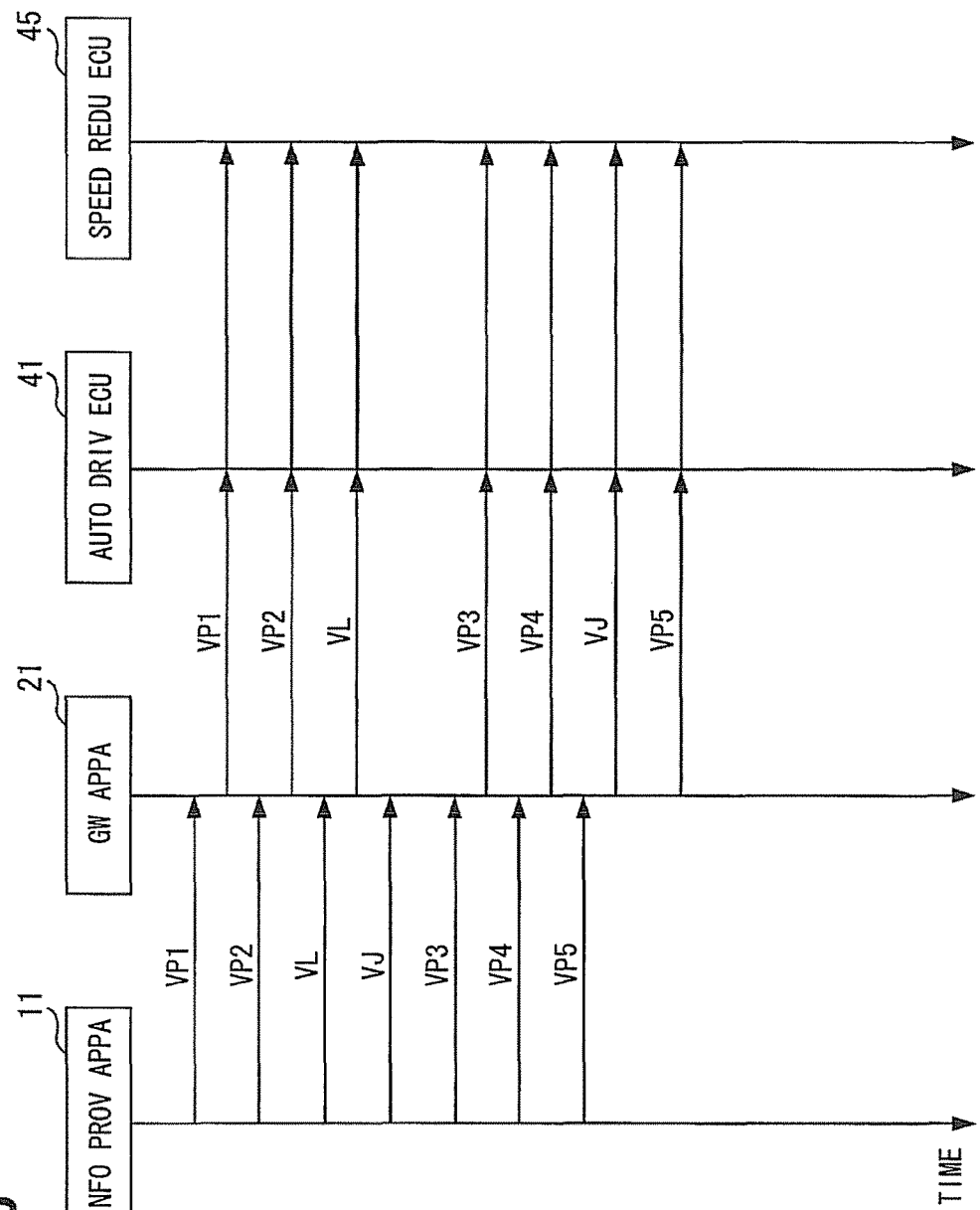

IN-VEHICLE GATEWAY APPARATUS, COMMUNICATION SYSTEM FOR VEHICLE AND PROGRAM PRODUCT FOR TRANSMITTING VEHICLE RELATED DATA SET

CROSS REFERENCE TO RELATED APPLICATION

This application is based on Japanese Patent Application No. 2012-006411 filed on Jan. 16, 2012, the disclosure of which is incorporated herein by reference.

TECHNICAL FIELD

The present disclosure relates to an in-vehicle gateway apparatus receiving a vehicle related data from an in-vehicle apparatus and transmitting the vehicle related data to another in-vehicle apparatus, a communication including the in-vehicle gateway apparatus, and a program product for transmitting a vehicle related data set from one in-vehicle apparatus to another in-vehicle apparatus.

BACKGROUND

Conventionally, as disclosed in JP 2002-530245 A (corresponding to U.S. Pat. No. 6,941,194 B1), a communication system for a vehicle for exchanging a vehicle related data within the vehicle is well known. The communication system includes at least one calculate unit being placed in the vehicle for controlling a predetermined operation, which is also referred to as an application, a plurality of data sources coupled to the calculate unit, and an operation unit. The calculate unit includes a priority manage portion, which determines a priority of an access privilege to a data bus based on a present load state of the data bus.

Recently, a vehicle is usually equipped with more than one in-vehicle local area networks (LANs), and electronic control units. (ECU) equipped to the vehicle may be coupled to different LANs from one another. An ECU, which performs a predetermined operation, is also referred to as an application. In a case where ECUs coupled to the different LANs need to use a vehicle related data, which is transmitted from the same data source, an in-vehicle gateway apparatus may be disposed between the data source and the different LANs to which the ECUs are respectively coupled. The in-vehicle gateway apparatus receives the vehicle related data from the data source, converts the vehicle related data based on a corresponding protocol of each of the LANs. Then, the in-vehicle gateway apparatus transmits each converted vehicle related data to a corresponding LAN.

In the communication system disclosed in JP 2002-530245 A, when the in-vehicle gateway apparatus converts the vehicle related data based on the corresponding protocol of each of the LANs and transmits the converted data to the corresponding LAN, a communication traffic of a LAN having a low speed is more likely to increase than a communication traffic of a LAN having a high speed. Further a time when each ECU receives the vehicle related data, which is transmitted from the data source, may be different depending on the in-vehicle LAN coupled to each ECU. In this case, in order to perform a cooperative operation among the ECUs respectively coupled to the different LANs, one or more ECUs need to perform a data buffering in order to synchronize with other ECUs coupled to a different LAN. In this case, the ECUs are required to perform additional operations to achieve a synchronization compared with a case in which the data sources and the ECUs are coupled in a point-to-point manner.

SUMMARY

In view of the foregoing difficulties, it is a first object of the present disclosure to provide an in-vehicle gateway apparatus, which reduces a communication traffic of an in-vehicle LAN having a low speed and reduces operations required to be performed by an electronic control unit. It is a second object of the present disclosure to provide a communication system for a vehicle, reduces a communication traffic of an in-vehicle LAN having a low speed. It is a third object of the present disclosure to provide a program product for transmitting a vehicle related data set from one in-vehicle apparatus to another in-vehicle apparatus.

According to a first aspect of the present disclosure, an in-vehicle gateway apparatus includes a first communication section and a second communication section. The first communication section receives a vehicle related data set from a data transmit apparatus. The vehicle related data set includes a plurality of data elements. The second communication section transmits a processed data set processed based on the vehicle related data set to an in-vehicle local area network (LAN) group. The in-vehicle LAN group is communicably coupled to the second communication section and at least includes a first in-vehicle LAN and a second in-vehicle LAN. The first in-vehicle LAN has a first communication speed defined by a first communication protocol of the first in-vehicle LAN, and the second in-vehicle LAN has a second communication speed, which is lower, than the first communication speed, defined by a second communication protocol of the second in-vehicle LAN. The second communication section transmits a first processed data set, which is processed based on the vehicle related data set, to the first in-vehicle LAN based on the first communication protocol, and transmits a second processed data set, which is processed based on the vehicle related data set and has less data elements than the first processed data set, to the second in-vehicle LAN based on the second communication protocol.

In the above apparatus, a communication traffic of the second in-vehicle LAN, which has a lower speed than the first in-vehicle LAN, is reduced.

According to a second aspect of the present disclosure, a communication system for a vehicle includes a data transmit apparatus, an in-vehicle gateway apparatus, and a plurality of data process devices. The data transmit apparatus transmits a vehicle related data set including a plurality of data elements. The in-vehicle gateway apparatus is communicably coupled to the data transmit apparatus. The in-vehicle gateway apparatus includes a first communication section and a second communication section. The first communication section receives the vehicle related data set from the data transmit apparatus. The second communication section transmits a processed data set processed based on the vehicle related data set to an in-vehicle local area network (LAN) group. The in-vehicle LAN group is communicably coupled to the second communication section and at least includes a first in-vehicle LAN and a second in-vehicle LAN. The data process devices at least include a first data process device, which is communicably coupled to the first in-vehicle LAN, and a second data process device, which is communicably coupled to the second in-vehicle LAN. The first in-vehicle LAN has a first communication speed defined by a first communication protocol of the first in-vehicle LAN, and the second in-vehicle LAN has a second communication speed defined by a second communication protocol of the second in-vehicle LAN. The second communication speed is lower than the first communication speed. The second communication section transmits a first processed data set, which is processed based on the vehicle related data set, to the first in-vehicle LAN based on the first communication protocol, and transmits a second processed data set, which is processed based on the vehicle related data set and has less data elements than the first processed data set, to the second in-vehicle LAN based on the second communication protocol. The first data process device performs a predetermined operation based on the first processed data set, and the second data process device performs a predetermined operation based on the second processed data set.

In the above system, a communication traffic of the second in-vehicle LAN, which has a lower speed than the first in-vehicle LAN, is reduced.

According to a third aspect of the present disclosure, a program product stored in a non-transitory computer readable storage medium includes instructions for execution by a computer. The computer is coupled to a data transmit apparatus, which transmits a vehicle related data set including a plurality of data elements, and plurality of in-vehicle local area networks (LANs) having different communication protocols with one another. The in-vehicle LANs at least include a first in-vehicle LAN and a second in-vehicle LAN, which has a communication speed lower than a communication speed of the first in-vehicle LAN. The instructions include receiving the vehicle related data set from the data transmit apparatus, processing the vehicle related data set to generate a first processed data set including all of the data elements included in the vehicle related data set and a second processed data set including less data elements than the first processed data set, transmitting the first processed data set to the first in-vehicle LAN based on a first communication protocol of the first in-vehicle LAN, and transmitting the second processed data set to the second in-vehicle LAN based on a second communication protocol of the second in-vehicle LAN.

In the above program product, a communication traffic of the second in-vehicle LAN, which has a lower speed than the first in-vehicle LAN, is reduced.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram showing a transmit order of the vehicle related data sets to ECUs.

DETAILED DESCRIPTION

The following will describe embodiments of the present disclosure with reference to drawings.

First Embodiment

Figure 1:
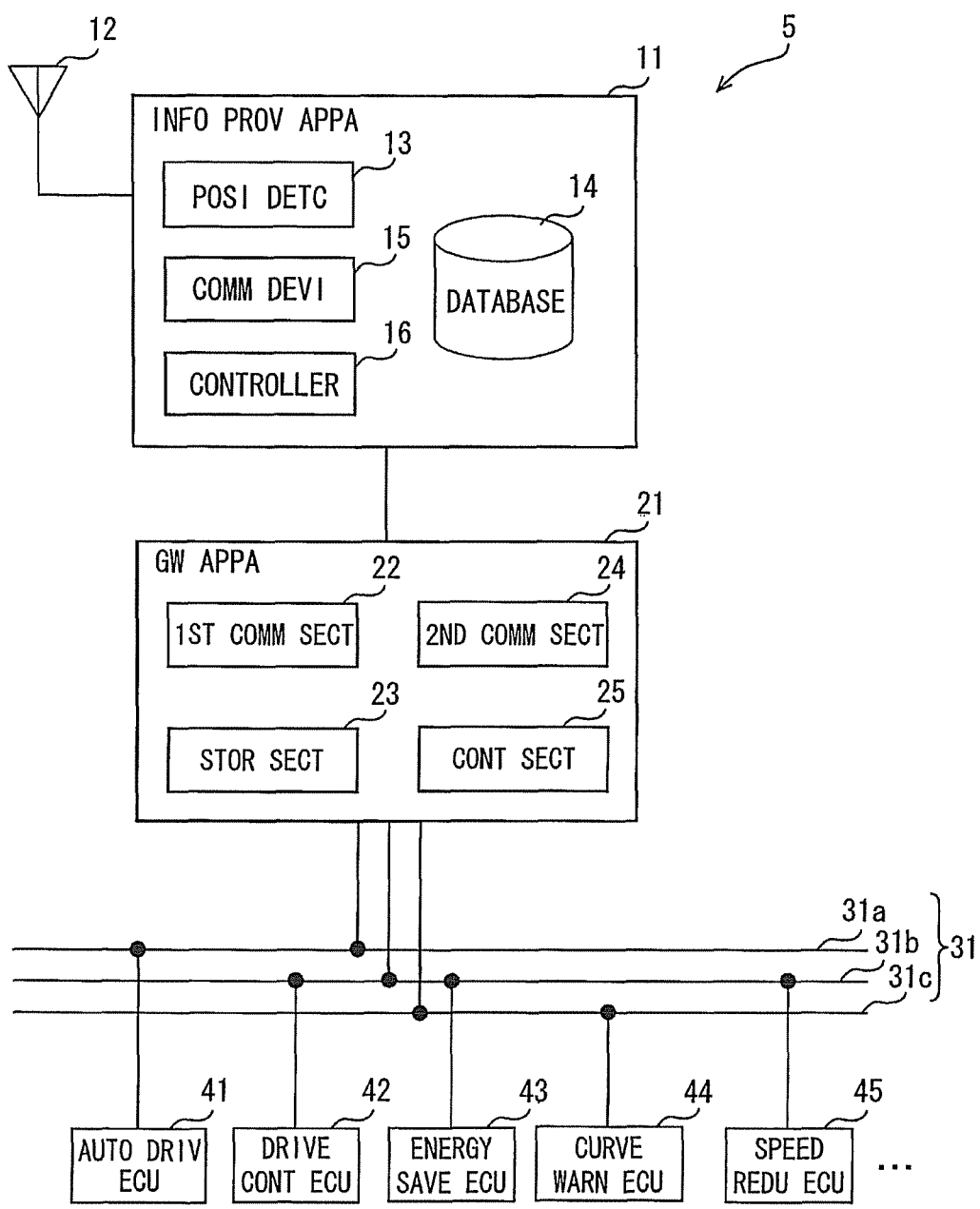
FIG. 1 is a block diagram showing a configuration of a communication system for a vehicle according to the present disclosure.

The following will describe a configuration of a communication system 5 for a vehicle according to a first embodiment of the present disclosure with reference to FIG. 1. Hereinafter, the communication system 5 for the vehicle is also referred to as the communication system 5. The communication system 5 includes an information providing apparatus (INFO PROV APPA) 11, an in-vehicle gateway apparatus (GW APPA) 21, an in-vehicle local area network (LAN) group 31, an automatic drive (AUTO DRIV) electronic control unit (ECU) 41, a drive control (DRIV CONT) ECU 42, an energy saving (ENERGY SAVE) ECU 43, a curve warning (CURVE WARN) ECU 44, and a speed reduce (SPEED REDU) ECU 45. The information providing apparatus 11 provides a vehicle related data set including a vehicle position data element, which indicates a present position of the vehicle, and a forward map data set, which indicates information related to a forward area in a route.

The information providing apparatus 11 includes an antenna 12, a position detector (POST DETC) 13, a map database (DATABASE) 14, a communication device (COMM DEVI) 15, and a controller 16.

The antenna 12 receives radio signals from global position system (GPS) satellites. The antenna 12 transmits the radio signals received from the GPS satellites to the position detector 13. The position detector 13 calculates a present position and a traveling direction of the information providing apparatus 11 based on the signals received from the antenna. Since, the information providing apparatus 11 is placed in the vehicle, the present position and the traveling direction of the information providing apparatus 11 is the same with a present position and a traveling direction of the vehicle. Then, the position detector 13 transmits the calculated present position and the traveling direction to the controller 16. Further, the position detector 13 may calculate the present position and the traveling direction via a map matching based on signals transmitted from, for example, a gyroscope, a speed sensor, and map data acquired from the map database 14.

The map database 14 may be provided by a storage media such as a hard disk, a solid state drive (SSD), and a digital versatile disk read only memory (DVD-ROM). The map database 14 stores various map data elements, which include a road shape point data element, a road junction data element, a traffic lane data element, a road grade data element, a road curvature data element, a topographic data element, a facility data element, and a place name data element and the like.

The communication device 15 performs a communication with the in-vehicle gateway apparatus 21. Specifically, the communication device 15 controls a transmitting of a data from the information providing apparatus 11 to the in-vehicle gateway apparatus 21. The controller 16 is provided by a microcomputer, which includes a central processing unit (CPU), a random access memory (RAM), and a flash memory. The controller 16 performs a predetermined operation by executing a program stored in the flash memory. For example, the controller 16 reads out, predetermined map data elements from the map database 14, and transmits the predetermined map data elements to the in-vehicle gateway apparatus 21 at predetermined time intervals such as every 0.1 second. The predetermined map data elements are defined such that the predetermined map data elements include map information related to a predetermined forward area in the traveling direction with respect to the present position. Thus, the predetermined map data elements are also referred to as a forward map data set, and is calculated based on the traveling direction and the present position of the vehicle, which are calculated by the position detector 13.

Each or any combination of sections explained below can be achieved as (i) a software section in combination with a hardware unit (e.g., computer) or (ii) a hardware section, including or not including a function of a related apparatus; furthermore, the hardware section may be constructed inside of a microcomputer. Furthermore, the software section may be included in a software program, which may be contained in a non-transitory computer-readable storage media as a program product.

The in-vehicle gateway apparatus 21 includes a first communication section (1ST COMM SECT) 22, a storing section (STOR SECT) 23, a second communication section (2ND COMM SECT) 24, and a control section (CONT SECT) 25.

The first communication section 22 performs a communication with the information providing apparatus 11. Further, as shown in FIG. 1, the in-vehicle gateway apparatus 21 and the information providing apparatus 11 is coupled via a communication line, which is not included in the in-vehicle LAN group 31. Further, the in-vehicle gateway apparatus 21 and the information providing apparatus 11 may be coupled via an in-vehicle LAN included in the in-vehicle LAN group 31. For example, the in-vehicle gateway apparatus 21 and the information providing apparatus 11 may be coupled via a high-speed in-vehicle LAN 31a included in the in-vehicle LAN group 31. Further, the in-vehicle gateway apparatus 21 and the information providing apparatus 11 may also be coupled via another high-speed in-vehicle LAN, which is not included in the in-vehicle LAN group 31.

The storing section 23 mainly includes a semiconductor memory such as a dynamic random access memory (DRAM). The storing section 23 temporarily stores the vehicle related data, which is received by the first communication section 22 from the information providing apparatus 11. The second communication section 24 performs a communication with each ECU coupled to the in-vehicle LAN group 31. The in-vehicle LAN group 31 includes the high-speed in-vehicle LAN 31a, a medium-speed in-vehicle LAN 31b, and a low-speed in-vehicle LAN 31c. The second communication section 24 is coupled to each of the in-vehicle LANs 31a, 31b, 31c included in the in-vehicle LAN group 31, and performs a communication with each ECU, which is coupled to the in-vehicle LAN group 31.

The control section 25 is provided by a well-known microcomputer, which includes a CPU, RAM, and a flash memory. The control section 25 performs a predetermined operation by executing a program stored in the flash memory. For example, the control section 25 controls the storing section 23 to store the vehicle related data set, which is transmitted from the information providing apparatus 11. Further, the control section 25 transmits a part of the data elements included in the forward map data set to each of the in-vehicle LANs 31a, 31b, 31c.

As described above, the in-vehicle LAN group 31 includes the high-speed in-vehicle LAN 31a, the medium-speed in-vehicle LAN 31b, and the low-speed in-vehicle LAN 31c.

The high-speed in-vehicle LAN 31a has a communication speed defined by a communication protocol of the high-speed in-vehicle LAN 31a, the medium-speed in-vehicle LAN 31b has a communication speed defined by a communication protocol of the medium-speed in-vehicle LAN 31b, and the low-speed in-vehicle LAN 31c has a communication speed defined by a communication protocol of the low-speed in-vehicle LAN 31c. The communication speed of the medium-speed in-vehicle LAN 31b is lower than the communication speed of the high-speed in-vehicle LAN 31a, and the communication speed of the low-speed in-vehicle LAN 31c is lower than the communication speed of the medium-speed in-vehicle LAN 31b. For example, the communication speed of the high-speed in-vehicle LAN 31a may be 1 megabits per second (Mbps), the communication speed of the medium-speed in-vehicle LAN 31b may be 500 kilobits per second (kbps), and the communication speed of the low-speed in-vehicle LAN 31c may be 10 kbps.

The in-vehicle LANs 31a, 31b, 31c included in the in-vehicle LAN group 31 may be defined as a control area network (CAN), which is standardized under titles of international organization for standardization (ISO)11898 and ISO11519. Further, the in-vehicle LANs 31a, 31b, 31c may be defined as networks under a standard other than ISO11898 and ISO11519

The automatic drive ECU 41 controls an auto pilot of the vehicle. The automatic drive ECU 41 calculates an operation amount of a steering actuator based on the forward map data set. Specifically, the automatic drive ECU 41 calculates the operation amount of the steering actuator based on the road shape point data element, the road junction data element, and the traffic lane data element, which are included in the forward map data set. Then, the automatic drive ECU 41 transmits an operation command based on the calculated operation amount.

The drive control ECU 42 controls an engine or a motor. The drive control ECU 42 calculates an opening degree of a throttle of the engine or a power supply to the motor based on the forward map data set. Specifically, the drive control ECU 42 calculates the opening degree of the throttle of the engine or the power supply to the motor based on the road shape point data element and the road curvature data element, which are included in the forward map data set. Then, the drive control ECU 42 transmits an operation command to a throttle actuator or an electric power controller based on the calculated opening degree of the throttle of the engine or the power supply to the motor.

The energy saving ECU 43 controls an energy saving of the vehicle. The energy saving ECU 43 calculates an opening degree of a throttle of the engine or a power supply to the motor based on the forward map data set. Specifically, the energy saving ECU 43 calculates the opening degree of the throttle of the engine or the power supply to the motor based on the road grade data element included in the forward map data set. Then, the energy saving ECU 43 transmits an operation command to the throttle actuator or the electric power controller based on the calculated opening degree of the throttle of the engine or the power supply to the motor. The energy saving ECU 43 communicably operates with the drive control ECU 42.

The curve warning ECU 44 controls a warning of a curve placed forward to the driver before the vehicle enters the curve. The curve warning ECU 44 controls a display device (not shown) to display a warning message or controls a speaker (not shown) to output a warning audio signal based on the road curvature data element included in the forward map data set.

The speed reduce ECU 45 controls a brake operation of the vehicle so that a speed of the vehicle is controlled to be reduced by the speed reduce ECU 45.

As shown in FIG. 1, the ECUs 41, 42, 43, 44 are coupled to the in-vehicle LAN group 31. Further, other ECUs having different functions may also be coupled to the in-vehicle LAN group 31.

Figure 2:
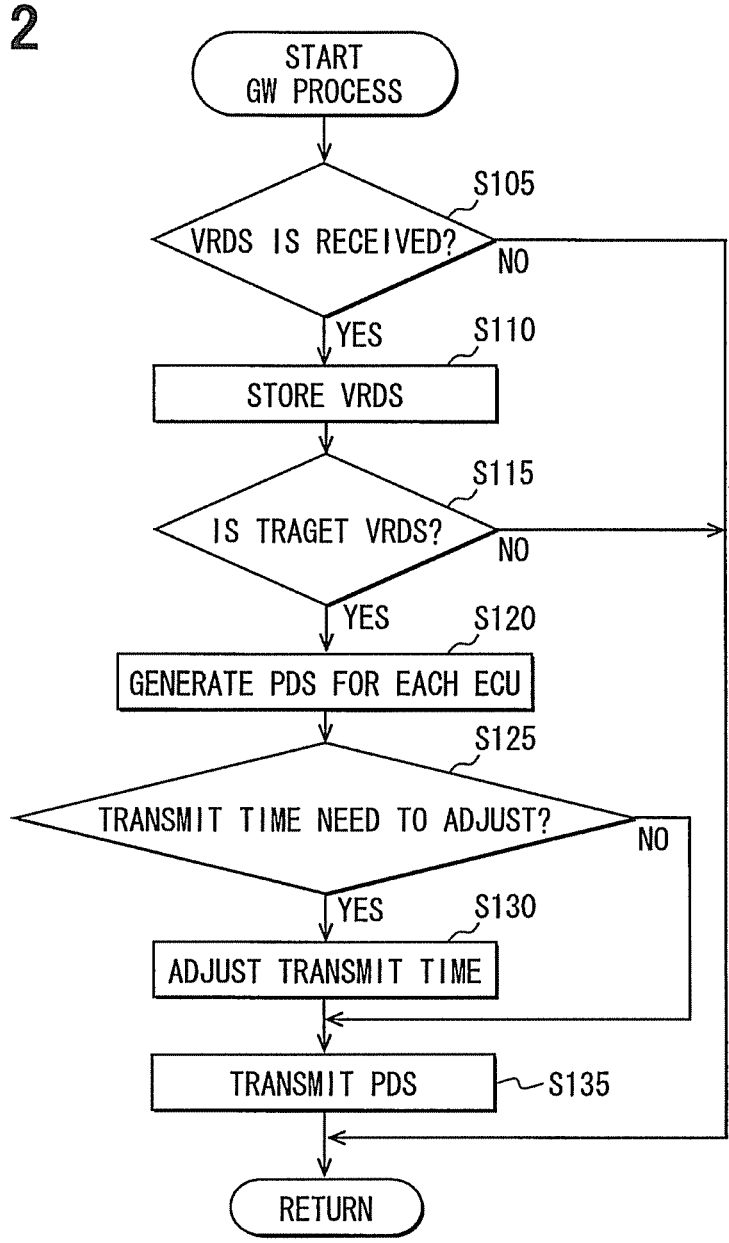
FIG. 2 is a flowchart showing a gateway process executed by an in-vehicle gateway apparatus according to the present disclosure.

The following will describe an operation of the communication system 5 according to the first embodiment. Specifically, a gateway process, which is a main process of the operation of the communication system 5, will be described. The gateway process is executed by the control section 25 of the in-vehicle gateway apparatus 21 as shown in FIG. 2. The gateway process starts when the in-vehicle gateway apparatus 21 is supplied with power.

When the gateway process starts, at S105, the control section 25 of the in-vehicle gateway apparatus 21 determines whether a first map data element of the vehicle related data set (VRDS) is received from the information providing apparatus 11 via the first communication section 22. When the control section 25 determines that the first map data element is received (S105: YES), the control section 25 proceeds to S110. When the control section 25 determines that the first map data element is not received (S105: NO), the control section 25 stands by at S105.

At S110, the control section 25 stores the vehicle related data set, which includes one or more map data elements, in the storing section 23. At S115, the control section 25 determines whether the vehicle related data set stored in the storing section 23 is a target vehicle related data set. Herein, the target vehicle related data set is defined as a vehicle related data set which needs to be transmitted to a target ECU by the in-vehicle gateway apparatus 21. For example, the target ECU may be defined as the automatic drive ECU 41. In a case where the target ECU is the automatic drive ECU 41, when the vehicle related data set includes the road shape point data element, the control section 25 determines that the vehicle related data set is the target vehicle related data set at S115. When the vehicle related data set only includes the facility data element, the control section 25 determines that the vehicle related data set is not the target vehicle related data set at S115. Further, the control section 25 may store a data type code of each data element included in the vehicle related data set in the storing section 23 together with the vehicle related data set. Each data type code indicates a data type of each data element included in the vehicle related data set. Then, the control section 25 may determine whether the stored vehicle related data set is the target vehicle related data set based on the data type codes.

At S120, the control section 25 respectively generates processed data sets (PDS) for the in-vehicle LANs 31a, 31b, 31c from the target vehicle related data set stored in the storing section 23. Each of the processed data set is generated based on a corresponding communication protocol of each in-vehicle LAN 31a, 31b, 31c. Specifically, the processed data set for the high-speed in-vehicle LAN 31a is processed based on the communication protocol of the high-speed in-vehicle LAN 31a. The processed data set for the medium-speed in-vehicle LAN 31b is processed based on the communication protocol of the medium-speed in-vehicle LAN 31b. The processed data set for the low-speed in-vehicle LAN 31c is processed based on the communication protocol of the low-speed in-vehicle LAN 31c. Each of the processed data set is generated for being transmitted to each of the in-vehicle LANs. Thus, the processed data set is also referred to as a transmit data set. Each of the processed data set generated by the control section 25 will be transmitted to the corresponding target ECU via one of the in-vehicle LANs 31a, 31b, or 31c. Further, the control section 25 may add an identification data element of the corresponding target ECU to each processed data set, the identification data element indicates identification information of the corresponding target ECU. Then, the control section 25 stores the processed data set in the storing section 23. More specifically, when the target ECU is coupled to the high-speed in-vehicle LAN 31a, the control section 25 processes the vehicle related data set to generate a processed data set for the high-speed in-vehicle LAN 31a. The processed data set for the high-speed in-vehicle LAN 31a includes all of the data elements included in the forward map data set. When the target ECU is coupled to the medium-speed in-vehicle LAN 31b, the control section 25 processes the vehicle related data set to generate a processed data set for the medium-speed in-vehicle LAN 31b. The processed data set for the medium-speed in-vehicle LAN 31b includes a part of the data elements included in the forward map data set. When the target ECU is coupled to the low-speed in-vehicle LAN 31c, the control section 25 processes the vehicle related data set to generate a processed data set for the low-speed in-vehicle LAN 31c. The processed data set for the low-speed in-vehicle LAN 31c includes a part of the data elements included in the forward map data set. Compared with the processed data set for the high-speed in-vehicle LAN 31a, the processed data set for the medium-speed in-vehicle LAN 31b and the processed data set for the low-speed in-vehicle LAN 31c have less data elements. Further, when generating the processed data set for each target ECU, an identification data element of the target ECU is added to the processed data set. As described above, the processed data set for the medium-speed in-vehicle LAN 31b includes a part of the data elements included in the forward map data set. Herein, the part of the data elements are selected by the control section 25. Thus, the processed data set for the high-speed in-vehicle LAN 31a, which includes all of the data elements of the forward map data set, is also referred to as a non-selected processed data set. The processed data sets for the medium-speed in-vehicle LAN 31b and the low-speed in-vehicle LAN 31c, which include a part of the data elements of the forward map data set, are also referred to as selected processed data sets. A method of generating the selected processed data set will be described later. The selected processed data set for the low-speed in-vehicle LAN 31c has less data elements than the selected processed data set for the medium-speed in-vehicle LAN 31b.

At S125, the control section 25 determines whether an adjustment of a transmit time at which the processed data set is to be transmitted to each of the in-vehicle LAN is necessary. Specifically, the control section 25 determines whether each processed data set includes a predetermined data element, which needs to be sent at a synchronized transmit time to each of the in-vehicle LANs 31a, 31b, 31c. The control section 25 determines whether the transmit time of each processed data set needs to be adjusted based on a data type of the predetermined data element originally included in the forward map data set received from the information providing apparatus 11. Further, the control section 25 may determine whether the transmit time of each processed data set needs to be adjusted based on the data type of the predetermined data element, which is included in the vehicle related data set transmitted from the information providing apparatus 11 or included in the processed data set for being transmitted to the target ECUs. When the control section 25 determines that the transmit time of the processed data sets for the in-vehicle LANs 31a, 31b, 31c needs to be adjusted (S125: YES), the control section 25 proceeds to S130. When the control section 25 determines that the transmit time of the processed data sets needs no adjustment (S125: NO), the control section 25 proceeds to S135.

At 130, the control section 25 adjusts the transmit time of the processed data sets to synchronize a transmit time of the predetermined data element, which is included in the vehicle related data set or included in the processed data sets, to each of the in-vehicle LANs 31a, 31b, 31c. For example, in order to adjust the transmit time of each processed data set to each in-vehicle LAN 31a, 31b, or 31c, the control section 25 may stand by until the control section 25 obtains transmit permits for the predetermined data element from all of the in-vehicle LANs 31a, 31b, 31c. Further, the control section 25 may stand by until each target ECU is ready to receive the predetermined data element included in the corresponding processed data set. Specifically, the control section 25 may inquire each target ECU for confirming whether the target ECU is ready to receive the predetermined data element. For example, in a case where the control section 25 transmits a road curvature data element for warning a curve, before transmitting the road curvature data element to the target ECU, the control section 25 may stand by and wait until a proper warning time. Herein, the proper warning time is a predetermined time before the vehicle enters the curve.

At S135, the control section 25 transmits each processed data set, which is stored in the storing section 23, to a target in-vehicle LAN, to which the target ECU is coupled. Then, the control section 25 returns to S105.

Figure 3:
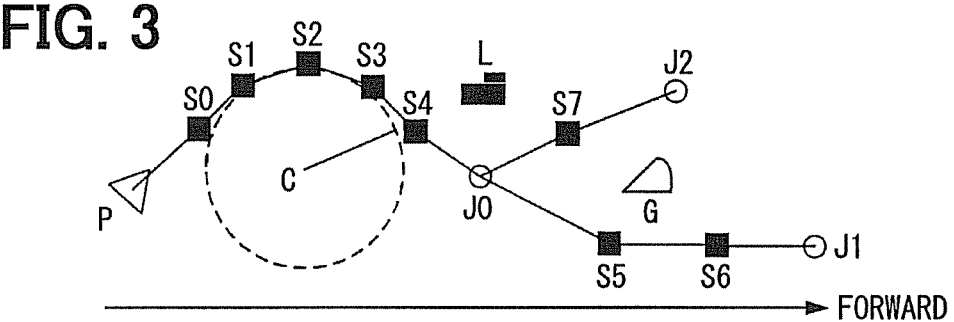
FIG. 3 is a diagram showing a vehicle related data set provided from an information providing apparatus.

The following will describe a data processing executed by the control section 25 in order to generate the processed data sets from the vehicle related data set with reference to FIG. 3 and FIG. 4.

FIG. 3 shows a case in which the information providing apparatus 11 transmits the vehicle related data set to the in-vehicle gateway apparatus 21 at a time. In this case, the vehicle related data set includes a vehicle position data element (P) and a forward map data set. The vehicle position data element indicates a present position and an orientation of the vehicle. The forward map data set may be set to include map information of a forward area, which starts from the present position to a predetermined distance forward in a scheduled route. For example, the predetermined distance may be set to 7 kilometers. In this case, the forward map data set includes road shape point data elements (S0 to S7), a road curvature data element (C), road junction data elements (J0 to J2), a traffic lane data element (L), and a road grade data element (G).

Figure 4A:
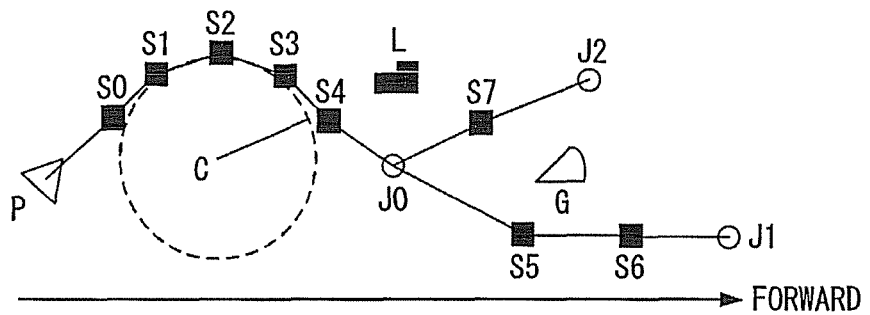
FIG. 4A to FIG. 4D are diagrams respectively showing vehicle related data sets provided to electronic control units (ECUs)

FIG. 4A shows the processed data set, which is to be transmitted from the in-vehicle gateway apparatus 21 to the automatic drive ECU 41 via the high-speed in-vehicle LAN 31a. In this case, the processed data set includes the vehicle position data element and all of the data elements of the forward map data set, which is received from the information providing apparatus 11. Then, the processed data set is transmitted from the in-vehicle gateway apparatus 21 to the high-speed in-vehicle LAN 31a based on the communication protocol of the high-speed in-vehicle LAN 31a.

Figure 4B:
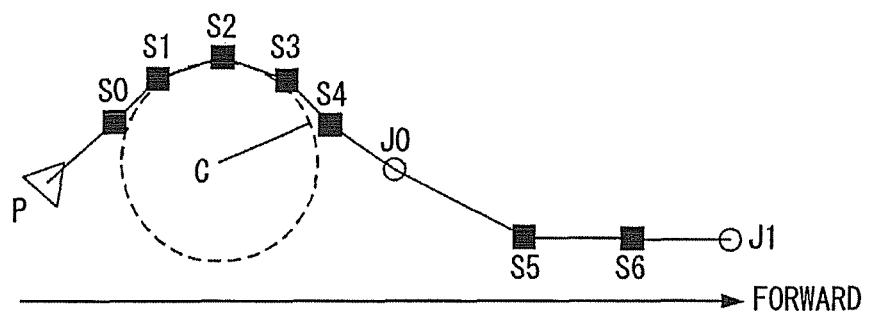

FIG. 4B shows the processed data set, which is to be transmitted from the in-vehicle gateway apparatus 21 to the drive control ECU 42. In this case, the processed data set includes a part of the road shape point data elements (S0 to S6), the road curvature data element (C), a part of the road junction data elements (J0, J1) of the forward map data set and the vehicle position data element (P), which are transmitted from the information providing apparatus 11. After generating the processed data set, the control section adds the identification data element of the drive control ECU 42 to the processed data set, and transmits the processed data set to the medium-speed in-vehicle LAN 31b based on the communication protocol of the medium-speed in-vehicle LAN 31b.

Figure 4C:

FIG. 4C shows the processed data set, which is to be transmitted from the in-vehicle gateway apparatus 21 to the energy saving ECU 43. In this case, the processed data set only includes the road grade data element (G) of the forward map data set, which is transmitted from the information providing apparatus 11. Then, the control section 25 adds the identification data element of the energy saving ECU 43 to the processed data set, and transmits the processed data set to the medium-speed in-vehicle LAN 31b based on the communication protocol of the medium-speed in-vehicle LAN 31b. In this case, the control section may control the transmit time of the processed data set so that the processed data set is transmitted to the energy saving ECU 43 at a time when the energy saving ECU 43 needs to control the energy saving based on the road grade data element.

Figure 4D:
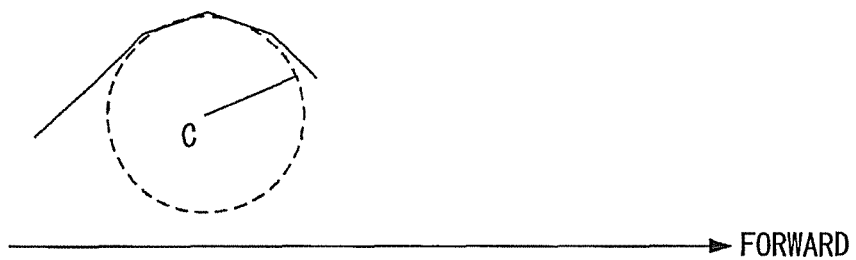

FIG. 4D shows the processed data set, which is to be transmitted from the in-vehicle gateway apparatus 21 to the curve warning ECU 44 via the low-speed in-vehicle VAN 31c. In this case, the processed data set only includes the road curvature data element (C) included in a sub-forward map data. The sub-forward map data set may be set to include map information of a sub-forward area, which starts from the present position to a predetermined distance forward in a scheduled route. The predetermined distance for defining the sub-forward area is smaller than the predetermined distance for defining the forward are. Thus, the sub-forward area is a part of the forward area. For example, the predetermined distance for defining sub-forward area may be set to 1 kilometer so that the sub-forward area is within the forward area. Then, the processed data set is transmitted to the low-speed in-vehicle LAN 31c based on the communication protocol of the low-speed in-vehicle LAN 31c. In this case, the processed data set may be transmitted to the curve warning ECU 44 at a time when the curve warning ECU 44 needs to control a warning of a forward curve based on the road curvature data element.

In the communication system 5 according to the present disclosure, the in-vehicle gateway apparatus 21 selectively transmits the data elements included in the forward map data set received from the information providing apparatus 11 to the in-vehicle LAN group 31. Specifically, the in-vehicle gateway apparatus 21 selects less data elements with a decrease in the communication speeds of the in-vehicle LANs 31a, 31b, 31c. With this configuration, the communication traffic of each in-vehicle LAN 31a, 31b, 31c is reduced corresponding to the communication speed of each in-vehicle LAN 31a, 31b, 31c.

Further, as shown at S130 in FIG. 2, when transmitting the processed data sets to the in-vehicle LANs 31a, 31b, 31c, the in-vehicle gateway apparatus 21 adjusts the transmit time of the processed data sets. With this configuration, when more than one ECUs are respectively coupled to different in-vehicle LANs and the ECUs respectively need to execute processes, which need a synchronization, the ECUs can execute the processes in a synchronization mode based on the predetermined data elements, which are transmitted at the transmit time adjusted by the in-vehicle gateway apparatus 21. In this case, functions required for each ECU for performing the synchronization of the transmit time of the predetermined data element is reduced compared with a case in which the ECU communicates with another ECU to synchronize the operation.

Further, in a case where more than one ECUs are coupled to the same in-vehicle LAN, the in-vehicle gateway apparatus 21 separately generates the processed data set for each ECU coupled to the same in-vehicle LAN. For example, as described at S120, S135 in FIG. 2, the in-vehicle gateway apparatus 21 separately generates two processed data sets for the two ECUs which are coupled to the medium-speed in-vehicle LAN 31b. With this configuration, each ECU, which is coupled to the medium-speed in-vehicle LAN 31b, identifies a destination of the processed data set based on the identification data element added to the processed data set. That is, each ECU determines whether the processed data set is destined for itself based on the identification data element added to the processed data set. Thus, a process load of each ECU is reduced compared with a case in which each ECU determines whether the processed data set is destined for itself based on a confirmation to contents of the processed data set.

Second Embodiment

Figure 5:
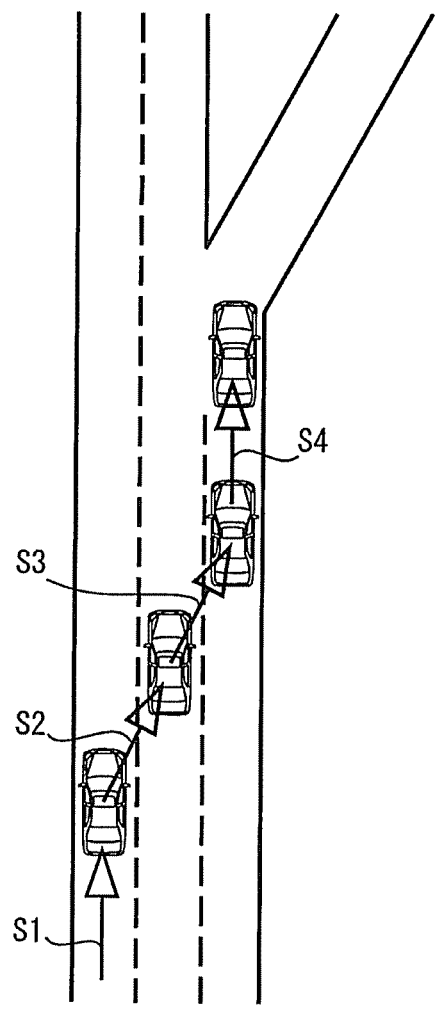
FIG. 5 is a diagram showing a transmitting of vehicle related data sets from an information providing apparatus in an actual case.

The following will describe a communication system 5 for a vehicle according to a second embodiment with reference to FIG. 5 and FIG. 6. The following description will omit the configuration, which is similar to the communication system 5 according to the first embodiment. In the first embodiment, when the in-vehicle gateway apparatus 21 receives more than one vehicle related data sets from the information providing apparatus 11, the in-vehicle gateway apparatus 21 transmits more than one processed data sets to the in-vehicle LANs in a transmit order, which is the same with a receive order of the more than one vehicle related data sets. For example, when the in-vehicle gateway apparatus 21 receives three vehicle related data sets A, B, C from the information providing apparatus 11 in a receive order of A, B, C, the in-vehicle gateway apparatus 21 generates and transmits three processed data sets A, B, C in a transmit order of A, B, C. In the communication system 5 according to the present embodiment, the transmit order of the processed data sets may be set differently from the receive order of the vehicle related data set.

The following is premised that an information providing apparatus according to the present disclosure is used in a left-hand traffic rule used in Japan or Great Britain. Without need to be limited thereto, the information providing apparatus according to the following embodiments can be used in a right-hand traffic rule used in the United States of America. In such a case, only the relation between the right and the left is reversed.

As shown in FIG. 5, during a state S1 shown by an arrow S1, a vehicle executes an automatic drive and a drive control. In the state S1, the vehicle keeps a present lane and runs at a constant speed. During a state S2 shown by an arrow S2, the vehicle changes a traffic line via the automatic drive. In state S2, the vehicle changes to a neighbor traffic lane. In the case shown in FIG. 5, the vehicle changes to a right traffic lane. During a state S3 shown by an arrow S3, the vehicle changes to a traffic lane, which connects to an exit path. During a state S4 shown by an arrow S4, the vehicle executes a speed reduce control for entering the exit path.

In the case shown in FIG. 5, a receive order of the vehicle related data sets from the information providing apparatus 11 and a transmit order of the processed data sets to the ECUs is shown in FIG. 6.

As shown in FIG. 6, the information providing apparatus 11 transmits, to the in-vehicle gateway apparatus 21, a first vehicle related data set VP1, a second vehicle related data set VP2, a third vehicle related data set VL, a fourth vehicle related data set V3, a fifth vehicle related data set VP3, a sixth vehicle related data set VP4, and a seventh vehicle related data set VP5. Each of the first, second, fifth, sixth, and seventh vehicle related data sets respectively include a vehicle position data element. The third vehicle related data set VL includes a traffic lane data element, and the fourth vehicle related data set V3 includes a road junction data element. As described above, the in-vehicle gateway apparatus 21 processes each of the vehicle related data sets transmitted from the information providing apparatus to a processed data set, and transmits to the target ECU. Hereinafter, for an easy description, although, the processing of the processed data set from the vehicle related data is omitted, the in-vehicle gateway apparatus 21 transmits the processed data set, which corresponds to each vehicle related data set, to the target ECU.

When receiving the first vehicle related data set VP1, the in-vehicle gateway apparatus 21 promptly transmits the first vehicle related data set VP1 to the automatic drive ECU 41 and the speed reduce ECU 45. As described above, the speed reduce ECU 45 controls the brake operation of the vehicle so that the speed is controlled to be reduced by the speed reduce ECU 45. The speed reduce ECU 45 is coupled to the medium-speed in-vehicle LAN 31b.

When receiving the second vehicle related data set VP2, the in-vehicle gateway apparatus 21 promptly transmits the second vehicle related data set VP2 to the automatic drive ECU 41 and the speed reduce ECU 45. When receiving the third vehicle related data set VL including the traffic lane data element, the in-vehicle gateway apparatus 21 promptly transmits the third vehicle related data set VL to the automatic drive ECU 41 and the speed reduce ECU 45. As shown in FIG. 5, when receiving the third vehicle related data set VL, the automatic drive ECU 41 controls the vehicle to change the traffic lane from the state S2 to the state S3.

After changing the traffic lane, when receiving the fourth vehicle related data set VJ including the road junction data element, the in-vehicle gateway apparatus 21 stands by until a proper time to transmit the fourth vehicle related data set VJ to the automatic drive ECU 41 and the speed reduce ECU 45. The proper time is a time when the vehicle starts to reduce the speed. Hereinafter, the proper time is also referred to as a speed reduce start time. The control section 25 may determine the speed reduce start time based on a distance between the position of the junction, which is acquired from the road junction data element, and a present position of the vehicle, which is acquired from the vehicle position data element. Thus, when the fourth vehicle related data set VJ including the road junction data element is transmitted to the vehicle at the speed reduce start time, the speed reduce ECU 45 only needs to control the brake at a receive time of the fourth vehicle related data set VJ. Thus, the speed reduce ECU 45 has no need to determine when to control the brake in order to reduce the speed of the vehicle.

When receiving the fifth vehicle related data set VP3, the in-vehicle gateway apparatus 21 promptly transmits the fifth vehicle related data set VP3 to the automatic drive ECU 41 and the speed reduce ECU 45. When receiving the sixth vehicle related data set VP4, the in-vehicle gateway apparatus 21 promptly transmits the sixth vehicle related data set VP4 to the automatic drive ECU 41 and the speed reduce ECU 45.

Then, the in-vehicle gateway apparatus 21 transmits the fourth vehicle related data set VJ, which stands by for waiting a transmit time, to the automatic drive ECU 41 and the speed reduce ECU 45. When receiving the fourth vehicle related data set VJ, the speed reduce ECU 45 promptly controls the brake of the vehicle.

When receiving the seventh vehicle related data set VP5, the in-vehicle gateway apparatus 21 promptly transmits the seventh vehicle related data set VP5 to the automatic drive ECU 41 and the speed reduce ECU 45.

In the communication system 5 according to the present embodiment, the transmit order of the processed data sets is changed compared with the receive order of the vehicle related data sets. Each of the processed data sets is transmitted to the ECU at a proper time. Thus, the ECU performs an operation corresponding to the receive time of each processed data set. Thus, a process load of the ECU is reduced.

Other Embodiment

As described above, the identification data of each ECU coupled to the medium-speed in-vehicle LAN 31b is added to the processed data set. Further, the identification data of each ECU coupled to at least one of the high-speed in-vehicle LAN 31a and the low-speed in-vehicle LAN 31c may be added to the processed data set.

In the forgoing embodiments, the high-speed in-vehicle LAN 31a, the medium-speed in-vehicle LAN 31b, and the low-speed in-vehicle LAN 31c are physically separated from one another. Further, the three in-vehicle LANs 31a, 31b, 31c may be achieved in one in-vehicle LAN line in a logical manner. The logical manner may include a virtual manner.

In the forgoing embodiments, one processed data set is generated for one target ECU. Further, one processed data set may be generated for one or more ECUs, which need the same processed data set to perform an operation. In this case, an identification data element of an ECU group including the one or more ECUs may be added to the processed data set.

In the present disclosure, the information providing apparatus 11 operates as a data transmit apparatus, the first communication section 22 of the in-vehicle gateway apparatus 21 operates as a first communication section, the second communication section 24 of the in-vehicle gateway apparatus 21 operates as the second communication section, the high-speed in-vehicle LAN 31a or the medium-speed in-vehicle LAN 31b operates as the first in-vehicle LAN, the medium-speed in-vehicle LAN 31b or the low-speed in-vehicle LAN 31c operates as the second in-vehicle LAN, and the low-speed in-vehicle LAN 31c operates as the third in-vehicle LAN.

Each of the automatic drive ECU 41, the drive control ECU 42 and the like operates as a data process device. In FIGS. 2, S105 and S110 executed by the control section 25 operates as a receive section, S120 to S130 executed by the control section 25 operates as a control section, and S135 executed by the control section 25 operates as a transmit section.

The above disclosure has the following aspects.

According to a first aspect of the present disclosure, an in-vehicle gateway apparatus includes a first communication section and a second communication section. The first communication section receives a vehicle related data set from a data transmit apparatus. The vehicle related data set includes a plurality of data elements. The second communication section transmits a processed data set processed based on the vehicle related data set to an in-vehicle local area network (LAN) group. The in-vehicle LAN group is communicably coupled to the second communication section and at least includes a first in-vehicle LAN and a second in-vehicle LAN. The first in-vehicle LAN has a first communication speed defined by a first communication protocol of the first in-vehicle LAN, and the second in-vehicle LAN has a second communication speed, which is lower than the first communication speed, defined by a second communication protocol of the second in-vehicle LAN. The second communication section transmits a first processed data set, which is processed based on the vehicle related data set, to the first in-vehicle LAN based on the first communication protocol, and transmits a second processed data set, which is processed based on the vehicle related data set and has less data elements than the first processed data set, to the second in-vehicle LAN based on the second communication protocol.

In the above apparatus, a communication traffic of the second in-vehicle LAN, which has a lower communication speed than the first in-vehicle LAN, is reduced.

Further, the in-vehicle LAN group may further include a third in-vehicle LAN. The third in-vehicle LAN may have a third communication speed, which is lower than the second communication speed, defined by a third communication protocol of the third in-vehicle LAN. The second communication section may transmit a third processed data set, which is processed based on the vehicle related data set and has less data elements than the second processed data set, to the third in-vehicle LAN based on the third communication protocol. With this configuration, a communication traffic of the third in-vehicle LAN, which has a lower communication speed than the second in-vehicle LAN, is reduced.

Further, when the vehicle related data set includes a predetermined data element, the second communication section may synchronize a transmit time of the predetermined data element included in the first processed data set with a transmit time of the predetermined data element included in the second processed data set. Then, the second communication section may respectively transmit the first processed data set and the second processed data set to the first in-vehicle LAN and the second in-vehicle LAN at the transmit time. With this configuration, when more than one data process devices are respectively coupled to different in-vehicle LANs and the data process devices respectively need to execute processes, which need a synchronization, the data process devices can execute the processes in a synchronization mode based on the predetermined data elements, which are transmitted at the transmit time synchronized by the second communication section. Thus, functions required for each data process device for performing the synchronization is reduced compared with a case in which the data process device communicates with another data process device to synchronize the operation.

Further, when the first communication section receives a plurality of vehicle related data sets in a time order, the second communication section may transmit a plurality of first processed data sets, which are respectively processed based on the vehicle related data sets received in the time order, to the first in-vehicle LAN in a rearranged order, which is different from the time order, and may transmit a plurality of second processed data sets, which are respectively processed based on the vehicle related data sets received in the time order, to the second in-vehicle LAN in the rearranged order. With this configuration, the process devices perform operations based on the rearranged order of receiving the processed data sets.

Further, one of the first in-vehicle LAN and the second in-vehicle LAN may be coupled to one or more data process devices, each of which has a predetermined identification data element and performs a predetermined operation based on a corresponding processed data set transmitted from the second communication section. The corresponding processed data set may be one of the first processed data set and the second processed data set. When, the second communication section transmits the corresponding processed data set to one of the data process devices, the second communication section adds the predetermined identification data element of the one of the data process devices to the corresponding processed data set. With this configuration, each data process device identifies a destination of the processed data set based on the identification data element added to the processed data set. That is, each data process device determines whether the processed data set is destined for itself based on the identification data element added to the processed data set. Thus, a process load of each data process device is reduced compared with a case in which each data process device determines whether the processed data set is destined for itself based on a confirmation to contents of the processed data set.

According to a second aspect of the present disclosure, a communication system for a vehicle includes a data transmit apparatus, an in-vehicle gateway apparatus, and a plurality of data process devices. The data transmit apparatus transmits a vehicle related data set including a plurality of data elements. The in-vehicle gateway apparatus is communicably coupled to the data transmit apparatus. The in-vehicle gateway apparatus includes a first communication section and a second communication section. The first communication section receives the vehicle related data set from the data transmit apparatus. The second communication section transmits a processed data set processed based on the vehicle related data set to an in-vehicle local area network (LAN) group. The in-vehicle LAN group is communicably coupled to the second communication section and at least includes a first in-vehicle LAN and a second in-vehicle LAN. The data process devices at least include a first data process device, which is communicably coupled to the first in-vehicle LAN, and a second data process device, which is communicably coupled to the second in-vehicle LAN. The first in-vehicle LAN has a first communication speed defined by a first communication protocol of the first in-vehicle LAN, and the second in-vehicle LAN has a second communication speed defined by a second communication protocol of the second in-vehicle LAN. The second communication speed is lower than the first communication speed. The second communication section transmits a first processed data set, which is processed based on the vehicle related data set, to the first in-vehicle LAN based on the first communication protocol, and transmits a second processed data set, which is processed based on the vehicle related data set and has less data elements than the first processed data set, to the second in-vehicle LAN based on the second communication protocol. The first data process device performs a predetermined operation based on the first processed data set, and the second data process device performs a predetermined operation based on the second processed data set.

In the above system, a communication traffic of the second in-vehicle LAN, which has a lower speed than the first in-vehicle LAN, is reduced.

According to a third aspect of the present disclosure, a program product stored in a non-transitory computer readable storage medium includes instructions for execution by a computer. The computer is coupled to a data transmit apparatus, which transmits a vehicle related data set including a plurality of data elements, and a plurality of in-vehicle local area networks (LANs) having different communication protocols with one another. The in-vehicle LANs at least include a first in-vehicle LAN and a second in-vehicle LAN, which has a communication speed lower than a communication speed of the first in-vehicle LAN. The instructions include receiving the vehicle related data set from the data transmit apparatus, processing the vehicle related data set to generate a first processed data set including all of the data elements included in the vehicle related data set and a second processed data set including less data elements than the first processed data set, transmitting the first processed data set to the first in-vehicle LAN based on a first communication protocol of the first in-vehicle LAN, and transmitting the second processed data set to the second in-vehicle LAN based on a second communication protocol of the second in-vehicle LAN.

In the above program product, a communication traffic of the second in-vehicle LAN, which has a lower speed than the first in-vehicle LAN, is reduced.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. An in-vehicle gateway apparatus comprising:
   a first communication section, which receives a vehicle related data set from a data transmit apparatus, the vehicle related data set including a plurality of data elements;
   a second communication section, which transmits a processed data set processed based on the vehicle related data set to an in-vehicle local area network (LAN) group, the in-vehicle LAN group being communicably coupled to the second communication section and at least including a first in-vehicle LAN and a second in-vehicle LAN; and
   a control section generating, based on the vehicle related data set, a first processed data set and a second processed data set so that the second processed data set has a number of data elements less than a number of data elements of the first processed data set,
   wherein the first in-vehicle LAN has a first communication speed defined by a first communication protocol of the first in-vehicle LAN, and the second in-vehicle LAN has a second communication speed, which is lower than the first communication speed, defined by a second communication protocol of the second in-vehicle LAN,
   wherein the second communication section transmits the first processed data set, which is generated based on the vehicle related data set, to the first in-vehicle LAN based on the first communication protocol, and transmits the second processed data set, which is generated based on the vehicle related data set, to the second in-vehicle LAN based on the second communication protocol;

wherein, each of the first in-vehicle LAN and the second in-vehicle LAN is coupled to one or more electronic control units, each of the one or more electronic control units performs a predetermined operation based on a corresponding processed data set transmitted from the second communication section, the corresponding processed data set is one of the first processed data set or the second processed data set, wherein, the second communication section specifies, from the vehicle related data set, a transmission target data element that is to be transmitted to the one or more electronic control units and to be used by the one or more electronic control units, wherein the second communication section removes, from the vehicle related data set, data elements other than the transmission target data element to generate the first processed data set or the second processed data set;

wherein the plurality of data elements included in the vehicle related data set are provided by different types of data elements that are related to a travelling of the vehicle;

wherein the second communication section adapts an amount of data of the vehicle related data set to each of the first in-vehicle LAN and the second in-vehicle LAN in accordance with contents of each of the data elements in the vehicle related data set, so that the amount of data of the vehicle related data is reduced;

wherein, when the vehicle related data set includes a predetermined data element that is also included in the first processed data set and the second processed data set, the second communication section synchronizes a transmit time to transmit the predetermined data element included in the first processed data set and the predetermined data element included in the second processed data set and transmits the first processed data set to the first in-vehicle LAN and the second processed data set to the second in-vehicle LAN based at the synchronized transmit time; and wherein the first communication section, the second communication section, and the control section are implemented by at least one processor and memory storing computer-executable instructions that, when executed by the at least one processor, implement the first communication section, the second communication section, and the control section.

2. The in-vehicle gateway apparatus according to claim 1, wherein the in-vehicle LAN group further includes a third in-vehicle LAN, wherein the third in-vehicle LAN has a third communication speed, which is lower than the second communication speed, defined by a third communication protocol of the third in-vehicle LAN, wherein the second communication section transmits a third processed data set, which is processed based on the vehicle related data set and has less data elements than the second processed data set, to the third in-vehicle LAN based on the third communication protocol.

3. The in-vehicle gateway apparatus according to claim 1, wherein, when the first communication section receives a plurality of vehicle related data sets in a time order, the second communication section:

transmits a plurality of first processed data sets, which are respectively processed based on the vehicle related data sets received in the time order, to the first in-vehicle LAN in a rearranged order, which is different from the time order; and transmits a plurality of second processed data sets, which are respectively processed based on the vehicle related data sets received in the time order, to the second in-vehicle LAN in the rearranged order.

4. The in-vehicle gateway apparatus according to claim 1, wherein, one of the first in-vehicle LAN and the second in-vehicle LAN is coupled to one or more electronic control units, each of which has a predetermined identification data element and performs a predetermined operation based on a corresponding processed data set transmitted from the second communication section, the corresponding processed data set being one of the first processed data set and the second processed data set, and wherein, when the second communication section transmits the corresponding processed data set to one of the electronic control units, the second communication section adds the predetermined identification data element of the one of the electronic control units to the corresponding processed data set.

5. The in-vehicle gateway apparatus according to claim 1, wherein the plurality of data elements provided by the different types of data elements that are related to the travelling of the vehicle include a road shape point data element, a road junction data element and a traffic lane data element.

6. The in-vehicle gateway apparatus according to claim 1, wherein the second communication section removes entire data elements.

7. The in-vehicle gateway apparatus according to claim 1, wherein:

the different types of data elements include a road shape point data element, a road junction data element, a traffic lane data element, a road curvature data element, and a road grade data element.

8. The in-vehicle gateway apparatus according to claim 7, wherein the different types of data elements further include a topographic data element.

9. The in-vehicle gateway apparatus according to claim 8, wherein the different types of data elements further include a facility data element.

10. The in-vehicle gateway apparatus according to claim 9, wherein the different types of data elements further include a place name data element.

11. The in-vehicle gateway apparatus according to claim 1, wherein the control section generates the first and second data sets by removing data elements that are not needed by the one or more electronic control units.

12. A communication system for a vehicle comprising:

a controller, which transmits a vehicle related data set including a plurality of data elements;

an in-vehicle gateway communicably coupled to the controller, the in-vehicle gateway including:

a first communication section, which receives the vehicle related data set from the controller; and a second communication section, which transmits a processed data set processed based on the vehicle related data set to an in-vehicle local area network (LAN) group, the in-vehicle LAN group being communicably coupled to the second communication section and at least including a first in-vehicle LAN and a second in-vehicle LAN;

a control section generating, based on the vehicle related data set, a first processed data set and a second processed data set so that the second processed data set has a number of data elements less than a number of data elements of the first processed data set, and a plurality of electronic control units at least including a first electronic control unit, which is communicably coupled to the first in-vehicle LAN, and a second electronic control unit, which is communicably coupled to the second in-vehicle LAN, wherein the first in-vehicle LAN has a first communication speed defined by a first communication protocol of the first in-vehicle LAN, and the second in-vehicle LAN has a second communication speed defined by a second communication protocol of the second in-vehicle LAN, the second communication speed being lower than the first communication speed, wherein the second communication section transmits the first processed data set, which is processed based on the vehicle related data set, to the first in-vehicle LAN based on the first communication protocol, and transmits the second processed data set, which is processed based on the vehicle related data set, to the second in-vehicle LAN based on the second communication protocol, wherein the first electronic control unit performs a predetermined operation based on the first processed data set, and the second electronic control unit performs a predetermined operation based on the second processed data set;

wherein, each of the first in-vehicle LAN and the second in-vehicle LAN is coupled to one or more electronic control units, each of the one or more electronic control units performs a predetermined operation based on a corresponding processed data set transmitted from the second communication section, the corresponding processed data set is one of the first processed data set or the second processed data set, wherein, the second communication section specifies, from the vehicle related data set, a transmission target data element that is to be transmitted to the one or more electronic control units and to be used by the one or more electronic control units, wherein the second communication section removes, from the vehicle related data set, data elements other than the transmission target data element to generate the first processed data set or the second processed data set;

wherein the plurality of data elements included in the vehicle related data set are provided by different types of data elements that are related to a travelling of the vehicle;

wherein the second communication section adapts an amount of data of the vehicle related data set to each of the first in-vehicle LAN and the second in-vehicle LAN in accordance with contents of each of the data elements in the vehicle related data set, so that the amount of data of the vehicle related data is reduced;

wherein, when the vehicle related data set includes a predetermined data element that is also included in the first processed data set and the second processed data set, the second communication section synchronizes a transmit time to transmit the predetermined data element included in the first processed data set and the predetermined data element included in the second processed data set and transmits the first processed data set to the first in-vehicle LAN and the second processed data set to the second in-vehicle LAN based at the synchronized transmit time; and wherein the first communication section, the second communication section, and the control section are implemented by at least one processor and memory storing computer-executable instructions that, when executed by the at least one processor, implement the first communication section, the second communication section, and the control section.

13. The communication system according to claim 12, wherein the plurality of data elements provided by the different types of data elements that are related to the travelling of the vehicle include a road shape point data element, a road junction data element and a traffic lane data element.

14. The communication system according to claim 12, wherein the second communication section removes entire data elements.

15. A program product stored in a non-transitory computer readable storage medium comprising instructions for execution by a computer, the computer being coupled to a data transmit apparatus, which transmits a vehicle related data set including a plurality of data elements, and a plurality of in-vehicle local area networks (LANs) having different communication protocols with one another, the in-vehicle LANs at least including a first in-vehicle LAN and a second in-vehicle LAN, which has a communication speed lower than a communication speed of the first in-vehicle LAN, the instructions for implementing:

receiving the vehicle related data set from the data transmit apparatus;

processing the vehicle related data set to generate a first processed data set and a second processed data set, the first processed data set including all of the data elements included in the vehicle related data set, the second processed data set including a number of data elements fewer than a number of data elements of the first processed data set;

transmitting the first processed data set to the first in-vehicle LAN based on a first communication protocol of the first in-vehicle LAN;

transmitting the second processed data set to the second in-vehicle LAN based on a second communication protocol of the second in-vehicle LAN;

wherein, each of the first in-vehicle LAN and the second in-vehicle LAN is coupled to one or more electronic control units, each of the one or more electronic control units performs a predetermined operation based on a corresponding processed data set transmitted from a second communication section, the corresponding processed data set is one of the first processed data set or the second processed data set, wherein, the second communication section specifies, from the vehicle related data set, a transmission target data element that is to be transmitted to the one or more electronic control units and to be used by the one or more electronic control units, wherein the second communication section removes, from the vehicle related data set, data elements other than the transmission target data element to generate the first processed data set or the second processed data set;

wherein the plurality of data elements included in the vehicle related data set are provided by different types of data elements that are related to a travelling of the vehicle;

wherein the second communication section adapts an amount of data of the vehicle related data set to each of the first in-vehicle LAN and the second in-vehicle LAN in accordance with contents of each of the data elements in the vehicle related data set, so that the amount of data of the vehicle related data is reduced; and wherein, when the vehicle related data set includes a predetermined data element that is also included in the first processed data set and the second processed data set, the second communication section synchronizes a transmit time to transmit the predetermined data element included in the first processed data set and the predetermined data element included in the second processed data set and transmits the first processed data set to the first in-vehicle LAN and the second processed data set to the second in-vehicle LAN based at the synchronized transmit time.

16. The program product according to claim 15, wherein the plurality of data elements provided by the different types of data elements that are related to the travelling of the vehicle include a road shape point data element, a road junction data element and a traffic lane data element.

17. The program product according to claim 15, wherein the second communication section removes entire data elements.

18. A system comprising:
an in-vehicle local area network (LAN) group having a first in-vehicle LAN and a second in-vehicle LAN;
a controller; and
an in-vehicle gateway communicably coupled to the in-vehicle LAN group and to the controller, the in-vehicle gateway being configured to receive a vehicle related data set from the controller and configured to transmit a processed data set processed based on the vehicle related data set to the in-vehicle LAN group, the vehicle related data set including a plurality of data elements;
wherein the gateway is configured to generate, based on the vehicle related data set, a first processed data set and a second processed data set with a number of data elements of the second processed data set being less than a number of data elements of the first processed data set;
wherein the first in-vehicle LAN has a first communication speed defined by a first communication protocol of the first in-vehicle LAN and the second in-vehicle LAN has a second communication speed, which is lower than the first communication speed, defined by a second communication protocol of the second in-vehicle LAN;
wherein the in-vehicle gateway is further configured to transmit the first processed data set, which is generated based on the vehicle related data set, to the first in-vehicle LAN based on the first communication protocol and to transmit the second processed data set, which is generated based on the vehicle related data set, to the second in-vehicle LAN based on the second communication protocol;
wherein each of the first in-vehicle LAN and the second in-vehicle LAN is coupled to at least one electronic control unit configured to perform a predetermined operation based on a corresponding processed data set transmitted from the in-vehicle gateway, the corresponding processed data set being one of the first processed data set or the second processed data set;
wherein the in-vehicle gateway is configured to specify, from the vehicle related data set, a transmission target data element that is to be transmitted to the at least one electronic control unit and to be used by the at least one electronic control unit and configured to remove data elements from the vehicle related data set other than the transmission target data element to generate the first processed data set or the second processed data set;
wherein the plurality of data elements included in the vehicle related data set are provided by different types of data elements that are related to a travelling of a vehicle;
wherein the in-vehicle gateway is configured to adapt an amount of data of the vehicle related data set to each of the first in-vehicle LAN and the second in-vehicle LAN in accordance with contents of each of the data elements in the vehicle related data set so that the amount of data in the vehicle related data set is reduced; and
wherein, when the vehicle related data set includes a predetermined data element that is also included in the first processed data set and the second processed data set, the in-vehicle gateway is configured to synchronize a transmit time to transmit the predetermined data element included in the first processed data set and the predetermined data element included in the second processed data set and to transmit the first processed data set to the first in-vehicle LAN and the second processed data set to the second in-vehicle LAN based at the synchronized transmit time.

* * * * *